(12) United States Patent
Kimoto et al.

(10) Patent No.: US 7,230,404 B2
(45) Date of Patent: Jun. 12, 2007

(54) BATTERY PACK APPARATUS WITH HEAT SUPPLY AND DISCHARGE

(75) Inventors: Shinya Kimoto, Toyohashi (JP); Takaki Kobayashi, Nagoya (JP)

(73) Assignee: Panasonic EV Energy Co., Ltd., Shizuoka (JP)

( * ) Notice: Subject to any disclaimer, the term of this patent is extended or adjusted under 35 U.S.C. 154(b) by 308 days.

(21) Appl. No.: 10/806,116

(22) Filed: Mar. 23, 2004

(65) Prior Publication Data

US 2004/0232891 A1    Nov. 25, 2004

(30) Foreign Application Priority Data

Mar. 24, 2003    (JP)    ............................. 2003-080874

(51) Int. Cl.
*H01M 10/46*    (2006.01)
(52) U.S. Cl. ..................................... 320/150
(58) Field of Classification Search ............... 320/107, 320/112, 150
See application file for complete search history.

(56) References Cited

U.S. PATENT DOCUMENTS 6,709,783 B2    3/2004    Ogata et al.
7,061,208 B2 *    6/2006    Nishihata et al. ........... 320/150
2003/0211384 A1    11/2003    Hamada et al.
2004/0004461 A1    1/2004    Hamada et al.

FOREIGN PATENT DOCUMENTS

JP    2001-76771    3/2001
JP    2001-167803    6/2001

OTHER PUBLICATIONS

English Language Abstract of JP 2001-76771.
English Language Abstract of JP 2001-167803.
English Language Abstract of JP 7-192774.

* cited by examiner

*Primary Examiner*—Edward H. Tso
(74) *Attorney, Agent, or Firm*—Workman Nydegger (57) ABSTRACT

A battery pack apparatus includes a battery pack having multiple rechargeable batteries arranged in parallel and heat medium passages formed therebetween. The battery pack apparatus also includes a heat insulation cover formed of a heat insulation material that covers a circumferential surface of the battery pack substantially entirely. A supply passage and a discharge passage are provided between the heat insulation cover and the battery pack. The supply passage supplies a heat medium to the heat medium passages while the discharge passage discharges the heat medium from the heat medium passages. The battery pack apparatus also includes a supply device that supplies the heat medium to the supply passage.

15 Claims, 6 Drawing Sheets

BATTERY PACK APPARATUS WITH HEAT SUPPLY AND DISCHARGE

The present disclosure relates to subject matter contained in priority Japanese Patent Application No. 2003-80874, filed on Mar. 24, 2003, the contents of which is herein expressly incorporated by reference in its entirety.

BACKGROUND OF THE INVENTION

1. Field of the Invention

The present invention relates to a battery back apparatus having a battery pack composed of a plurality of rechargeable batteries, in which the temperature of each of the rechargeable batteries is regulated stably and uniformly.

2. Description of the Related Art

In a battery pack composed of a plurality of rechargeable batteries, in order to prevent increase in the temperature of each rechargeable battery caused by heat generated by charge/discharge of the rechargeable battery and thus prevent decrease in a battery power, charge/discharge efficiency, and a battery life, it is conventionally known that the rechargeable batteries are arranged in parallel with cooling medium passages interposed therebetween and a cooling medium supply device is provided for supplying a cooling medium to the cooling medium passages (see Japanese Patent Laid-Open Publication No. 2001-167803, for example).

It is also known that four side faces of a battery pack that has six side faces are thermally insulated by heat insulation material while the remaining two side faces are cooled (see Japanese Patent Laid-Open Publication No. Hei 7-192774, for example).

Moreover, it is also known that a case is provided for accommodating a plurality of rechargeable batteries while contacting the rechargeable batteries at their circumferential surfaces to be thermally coupled. The outer circumferential surface of the case is covered with heat insulation material, and a heat pipe for dissipating heat transferred to the case to the outside is provided on a wall surface of the case, (see Japanese Patent Laid-Open Publication No. 2001-76771).

In the configuration disclosed in Japanese Patent Laid-Open Publication No. 2001-167803, it is possible to cool the respective rechargeable batteries relatively efficiently and uniformly because they are cooled by making the cooling medium flow in the cooling medium passages between them. However, the rechargeable batteries are affected by radiation heat from sunlight and heat radiated from an automotive exhaust pipe and are also affected by the surrounding temperature greatly. Thus, it is difficult to keep the rechargeable batteries at a predetermined temperature stably and uniformly. Further, there is another problem in which heat efficiency is not good.

The configuration disclosed in Japanese Patent Laid-Open Publication No. Hei 7-192774 has the following problem. In this configuration, four side faces of the battery pack are covered with the heat insulation material while only the remaining two side faces are cooled. Although this configuration is hardly affected by heat from the outside, cooling capacity is low and uniform cooling cannot be achieved. Thus, the temperature of the rechargeable battery increases particularly around the center of the battery pack, resulting in a decreased battery life.

In the configuration disclosed in Japanese Patent Laid-Open Publication No. 2001-76771, heat of the rechargeable batteries accommodated in the case covered with the heat insulation material is dissipated to the outside of the case by means of the heat pipe. This configuration is hardly affected by heat from the outside. However, if it is tried to achieve the cooling capacity that can cool all the rechargeable batteries effectively only by using the heat pipe, a number of heat pipes, and a large amount of heat collecting material are necessitated. This reduces space efficiency and increases the cost. Nevertheless, it is difficult to uniformly cool the respective parts of the rechargeable batteries.

SUMMARY OF THE INVENTION

The present invention is devised in light of the aforementioned problem of the related art. It is an object of the present invention to provide a battery pack apparatus having a battery pack composed of a plurality of rechargeable batteries, in which the temperature of each of the rechargeable batteries is regulated at a predetermined temperature stably and uniformly.

A battery pack apparatus of the present invention includes: a battery pack composed of a plurality of rechargeable batteries arranged in parallel, the rechargeable batteries having heat medium passages formed therebetween; a heat insulation cover formed from a heat insulation material for covering a substantially entire circumferential surface of the battery pack with a supply passage and a discharge passage provided between the heat insulation cover and the battery pack, the supply passage supplying a heat medium to the heat medium passages while the discharge passage discharging the heat medium from the heat medium passages; and a supply device for supplying the heat medium to the supply passage. By making the heat medium flow in the heat medium passages between the rechargeable batteries, heat exchange occurs on the substantially entire surface of each of the rechargeable batteries and therefore the temperature control is performed efficiently and uniformly. Moreover, since the battery pack, the heat medium passage, the supply passage, and the discharge passage are covered with the heat insulation cover, escape of heat to the outside is prevented and transfer of radiation heat from the outside and heat from the surrounding atmosphere is also prevented, thereby improving thermal efficiency. Also, it is possible to regulate the temperature of the whole battery pack at a predetermined temperature efficiently and uniformly without being affected by the surrounding condition. Consequently, the increase and variation of the temperature is prevented, thereby making the battery life longer.

While novel features of the invention are set forth in the preceding, the invention, both as to organization and content, can be further understood and appreciated, along with other objects and features thereof, from the following detailed description and examples when taken in conjunction with the attached drawings.

DETAILED DESCRIPTION OF THE PREFERRED EMBODIMENTS

First Embodiment

Hereinafter, a battery back apparatus according to a first embodiment of the present invention will be described with reference to FIGS. 1 to 6B.

Referring to FIGS. 1 to 4, a battery pack apparatus 1 serves as a drive power source for an electric vehicle including hybrid vehicles. The battery pack apparatus 1 contains a battery pack 5 composed of 10 to 30 flat prismatic rechargeable batteries 2 arranged in parallel with heat medium passages 3 provided between the long side faces of the rechargeable batteries 2. The rechargeable batteries 2 thus arranged are sandwiched by a pair of end plates 4 provided at both ends in the aligning direction, and are fixed as a unit by a binding member (not shown) to complete the battery pack 5. Each rechargeable battery 2 is a battery module in which a plurality of cells (not shown) are arranged in the longitudinal direction of the long side face of the rechargeable battery 2 and are electrically connected in series. At both ends of the rechargeable battery 2, connection terminals 2a for connecting with the outside are provided. The battery pack 5 obtains a predetermined output voltage by successively connecting the connection terminals 2a of the rechargeable batteries 2 in series by bus bars (not shown).

The battery pack 5 is arranged in an accommodation space 8 formed by a lower case 6 and an upper case 7 while being supported at both ends in the longitudinal direction of the rechargeable batteries 2 by the lower case 6. A supply passage 9 for supplying a heat medium to the heat medium passage 3 is provided between the upper surface of the battery pack 5 and the upper case 7. A discharge passage 10 for discharging the heat medium from the heat medium passage 3 is provided between the lower surface of the battery pack 5 and the lower case 6. Moreover, on the outer surfaces of the lower case 6 and the upper case 7, a lower heat insulation cover 11 and an upper heat insulation cover 12 which are formed of foamed synthetic resin serving as heat insulation material are provided, respectively. On the outer surfaces of those heat insulation covers 11 and 12, covering layers formed by foil of metal such as aluminum are provided.

Figure 1:
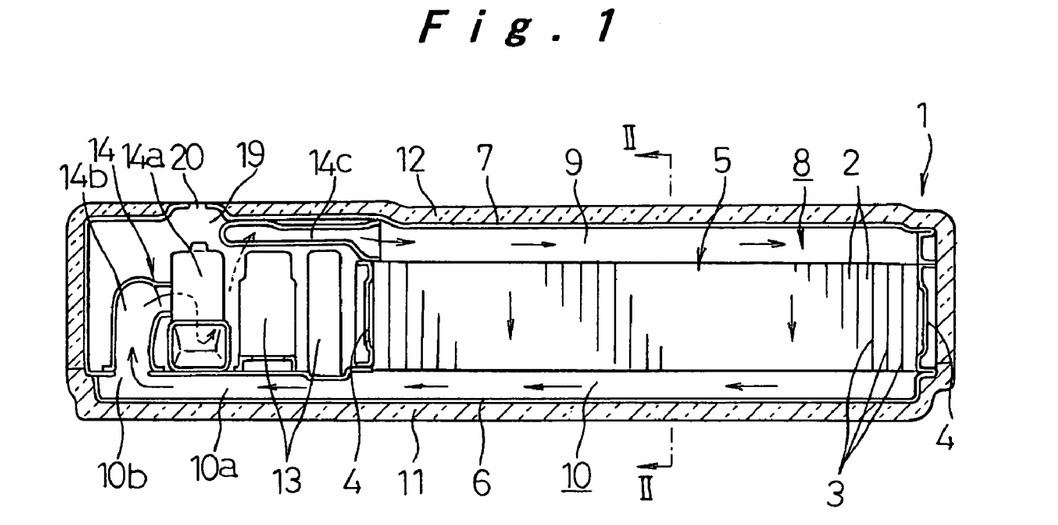
FIG. 1 is a longitudinal sectional front view of a battery pack apparatus according to a first embodiment of the present invention.
Figure 2:
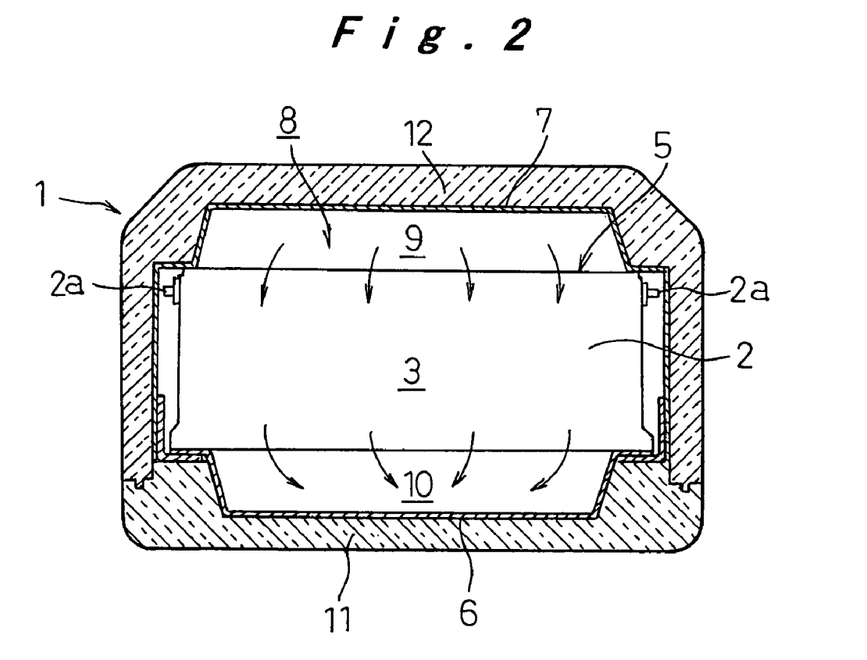
FIG. 2 is a cross-sectional view of the battery pack apparatus, taken along the line II—II in FIG. 1.
Figure 3:
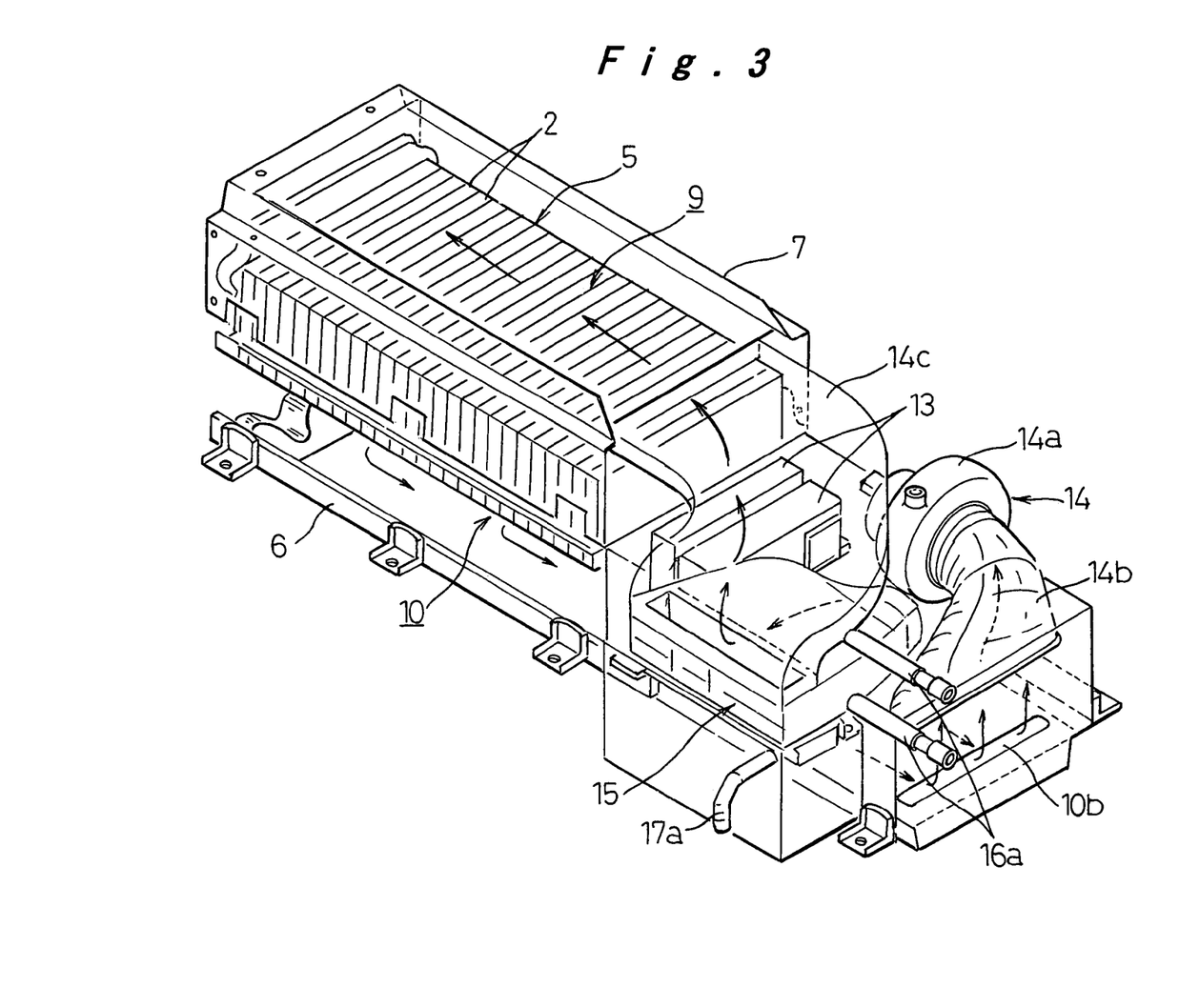
FIG. 3 is a perspective view of the battery pack apparatus according to the first embodiment while a heat insulation cover is removed.
Figure 4:
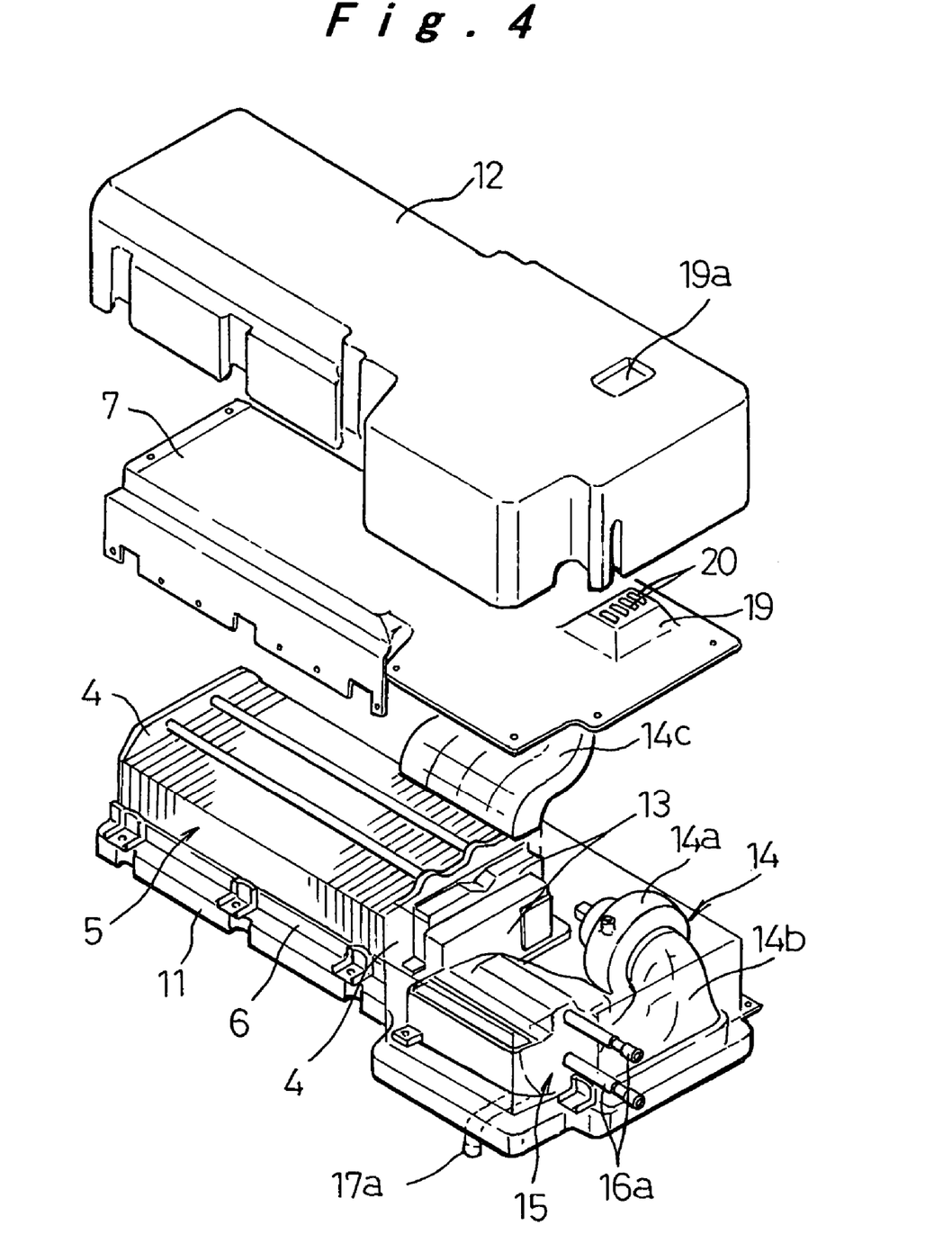
FIG. 4 is an exploded perspective view of the battery pack apparatus according to the first embodiment.

The upper and lower cases 7 and 6 extend from one side of a space in which the battery pack 5 is accommodated, as shown in FIG. 1. In a space formed by extending parts of the upper and lower cases 7 and 6, a control unit 13 for controlling charge and discharge of the respective rechargeable batteries 2, a supply device 14 for supplying a heat medium and a heating/cooling device 15 for heating or cooling the heat medium are provided. In the extending part of the lower case 6, a discharge passage 10a connected to the discharge passage 10 below the battery pack 5 is provided and a discharge port 10b is provided on the upper surface of the discharge passage 10a at the end of the extending part of the lower case 6.

The supply device 14 includes a fan 14a, an intake duct 14b connecting the discharge port 10b and an intake port of the fan 14a, and a supply duct 14c connecting the supply passage 9 and a discharge port of the fan 14a. The heating/cooling device 15 is provided between the discharge port and the supply duct 14c of the fan 14a.

Figure 5:
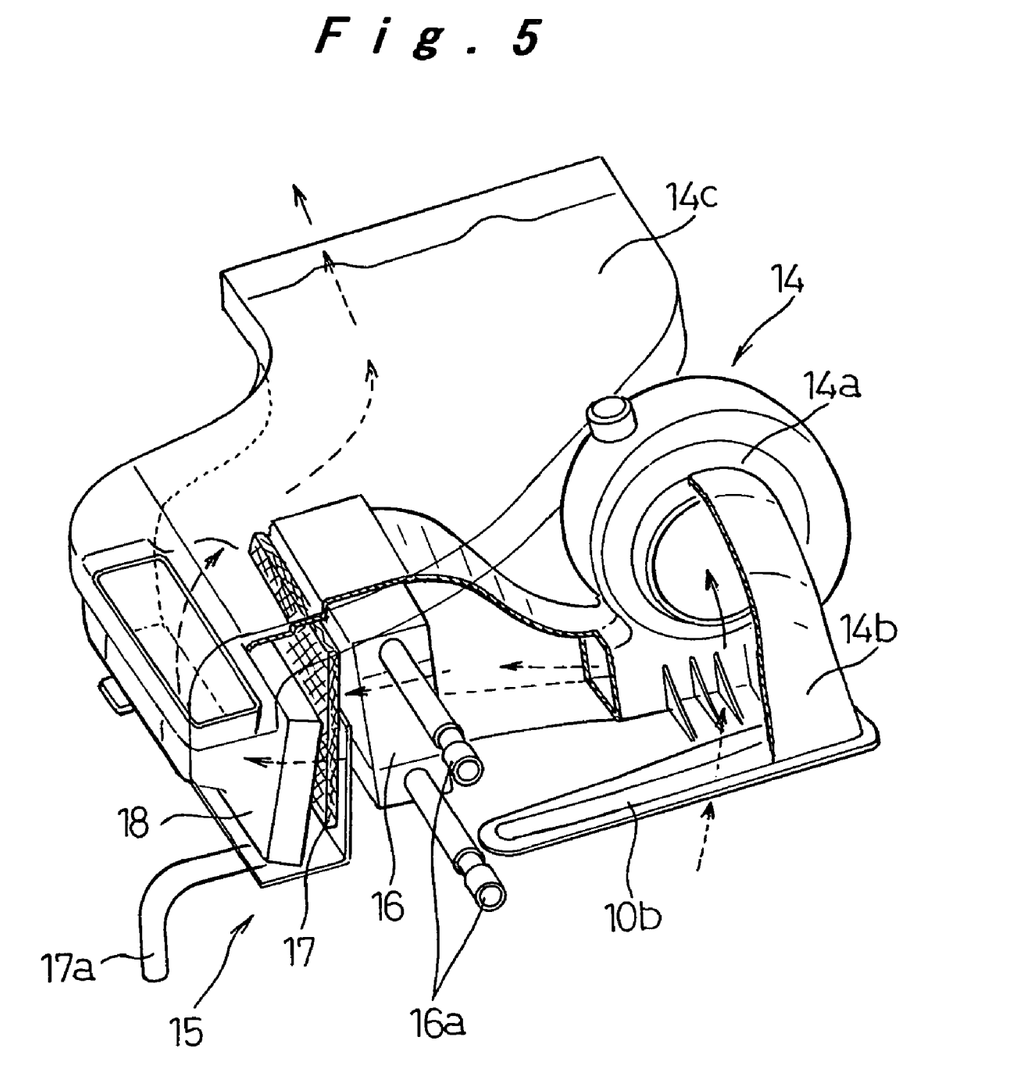
FIG. 5 is a perspective view of a supply device and a heating/cooling device in the first embodiment.

As shown in FIG. 5, the heating/cooling device 15 includes a heat exchanger 16 for introducing and circulating cooling water of an automobile so as to cool the heat medium, a protection net 17 for collecting and discharging drops of dew, and a heating device 18 using a PTC heater, a Peltier device, or the like. Moreover, a feed/drain pipe 16a is provided which feeds cooling water to the heat exchanger 16 and drains the cooling water from the heat exchanger 16, and a drain passage 17a is provided for draining the drops of dew collected by the protection net 17 to the outside.

In the upper case 7, an expanded space 19 is formed in a region near and above the control unit 13 to expand upward. The expanded space 19 has an opening 20 for opening the upper end of the expanded space 19 to the outside. The opening 20 has a relatively small area. In the upper heat insulation cover 12, an opening 19a is provided to allow the expanded space 19 to be inserted thereinto and allow the opening 20 to be communicated with the outside.

According to the above configuration, when the heat medium adjusted at a predetermined temperature by the heating/cooling device 15 is made to flow in the heat medium passage 3 between the rechargeable batteries 2 in the battery pack 5 by the supply device 14 via the supply passage 9 and then flow back to the supply device 14 through the discharge passage 10, heat exchange between the heat medium and each rechargeable battery 2 occurs on the substantially entire surface of each rechargeable battery 2. Thus, it is possible to efficiently control the whole battery pack 5 at a predetermined temperature by a compact and inexpensive configuration. In this manner, the battery output is obtained stably by heating or cooling the battery pack 5 in accordance with the temperature of the battery pack 5, and the battery life is made longer.

In addition, since the accommodation space 8 in which the battery pack 5, the supply passage 9, and the discharge passage 10 are arranged is covered with the heat insulation covers 11 and 12, heat transfer between the accommodation space 8 and the outside thereof is suppressed. Moreover, the covering layer formed by the metal foil is provided on the outer surface of each of the heat insulation covers 11 and 12 so as to reflect heat ray. Escape of heat to the outside as well as transfer of radiation heat from the outside and heat from the surrounding atmosphere are thus prevented, thereby achieving high thermal efficiency. Thus, it is possible to control the whole battery pack 5 at a predetermined temperature efficiently and uniformly without being affected by the surrounding condition. The increase and variation of the temperature in the battery pack 5 is reduced, thereby making the battery life longer.

Moreover, since the heat exchanger 16 for employing a cooling medium used in an automobile to cool the heat medium is applied to a cooling device of the heating/cooling device 15, the heat medium is cooled with high thermal efficiency by using the cooling medium used in the automobile.

In addition, since the control unit 13 is arranged next to the battery pack 5 within the accommodation space 8 covered with the heat insulation covers 11 and 12, the temperature of the control unit 13 is also regulated to be a predetermined temperature and thus the performance stability of the control unit 13 is ensured. Since the battery pack apparatus 1 incorporates the control unit 13 therein, the battery pack apparatus 1 is excellent in safety and is easy to handle. Moreover, when the battery pack apparatus 1 is formed, the expanded space 19 that expands upward is provided in a region near and above the control unit 13 and the upper end of that expanded space 19 is opened to the outside via the opening 20. Thereby, even in the arrangement where both the battery pack 5 and the control unit 13 are placed in the closed accommodation space 8, lightweight gas such as hydrogen gas flowing from the battery pack 5 collects in the expanded space 19 and then escapes via the opening 20 to the outside. Thus, gas flow into the control unit 13, which may cause fire, and adverse effects of the gas flow is prevented, thereby ensuring the safety.

Furthermore, since the heating/cooling device 15 is also provided within the closed accommodation space 8 and the discharge side of the supply device 14 is connected to the supply passage 9 via the heating/cooling device 15, the battery pack apparatus 1 having a temperature adjustment function which circulates the heat medium in a closed cycle is formed. In such a battery pack apparatus 1, the whole battery pack 5 is stably controlled at a predetermined temperature without being affected by the surrounding condition. Also, such a battery pack apparatus 1 is easy to handle. In addition, since the whole battery pack apparatus 1 is covered with the heat insulation covers 11 and 12, a noise transmitted to the outside is reduced. Moreover, drops of dew formed in the heat exchanger 16 serving as the cooling device of the heating/cooling device 15 are collected by the protection net 17 and are then drained through the drain passage 17a to the outside of the accommodation space 8. Thus, the drops of dew are smoothly drained to the outside and the atmosphere within the accommodation space 8 in which the heat medium is circulated in the closed cycle is kept favorable.

Figure 6A:
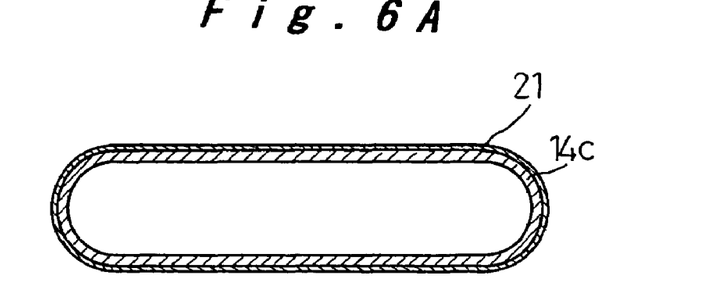
FIGS. 6A and 6B show cross sections of first and second modified examples of a supply duct according to the first embodiment.
Figure 6B:
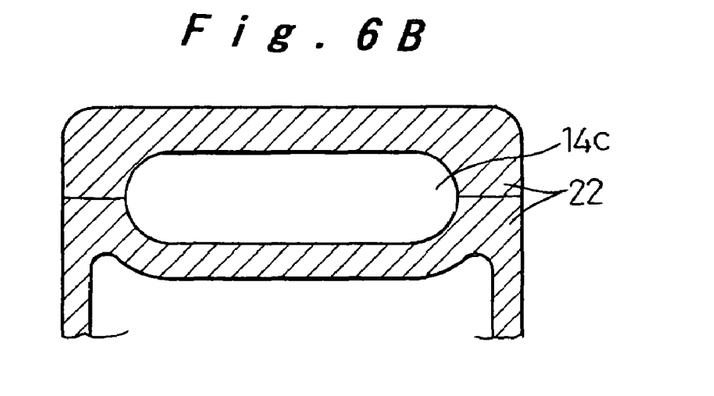

In the above description, an example is described in which the supply duct 14c is formed of synthetic resin or metal. In a case where such a battery pack apparatus 1 has started to operate after being subjected to high temperatures and high humidity for a long time, the temperature and humidity of the atmosphere in the accommodation space 8 are higher than the surrounding. When the heat medium cooled flows in the supply duct 14c, drops of dew may be formed on the outer surface of the supply duct 14c. The thus formed drops of dew may fall on the control unit 13 so as to adversely affect on the control unit 13. In order to prevent this, it is preferable that a polymer absorbing sheet 21 be attached to the outer surface of the supply duct 14c, as shown in FIG. 6A. Alternatively, the supply duct 14c can be formed from heat insulation material 22, as shown in FIG. 6B. Moreover, in a case where the intake duct 14b is provided above the control unit 13, it is preferable that the intake duct 14b be formed by taking measures against dew formation.

In the above description, a case is described where the discharge side of the supply device is connected to the supply passage via the heating/cooling device. However, the intake side of the supply device can be connected to the discharge passage via the heating/cooling device.

Second Embodiment

Figure 7:
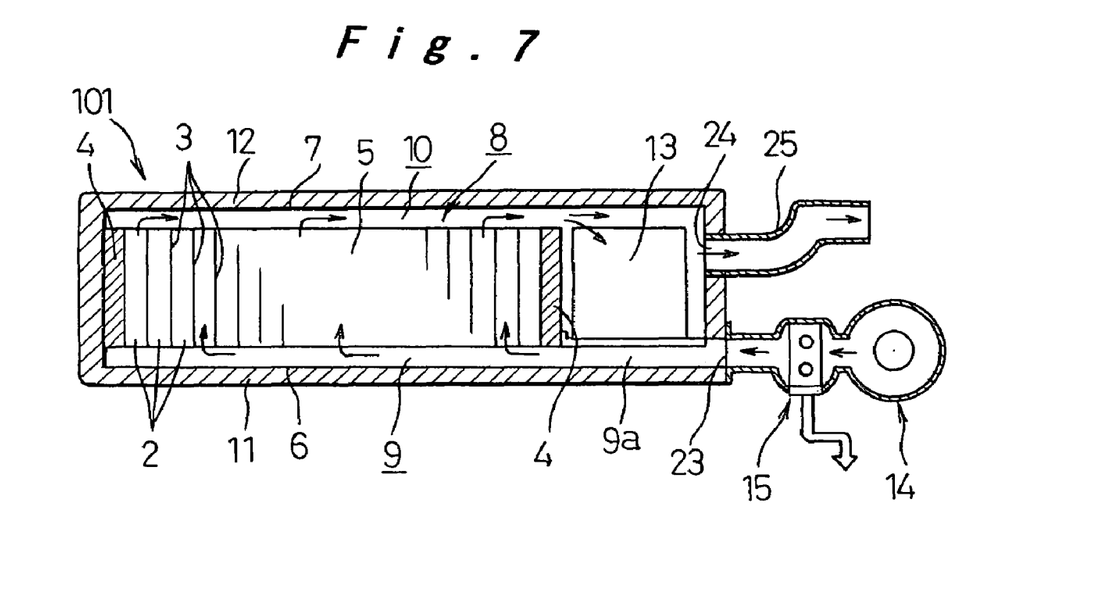
FIG. 7 is a longitudinal sectional front view of a battery pack apparatus according to a second embodiment of the invention.

Next, a battery pack apparatus according to a second embodiment of the present invention will be described with reference to FIG. 7. In the following description of embodiments, the same components as those in the preceding embodiment are labeled with the same reference numerals, and the descriptions thereof are omitted and only differences are described.

In the first embodiment, the supply device 14 and the heating/cooling device 15 are accommodated in the accommodation space 8 covered with the heat insulation covers 11 and 12. On the other hand, in a battery pack apparatus 101 of the present embodiment, the battery pack 5 and the control unit 13 are accommodated in the accommodation space 8 formed by the lower case 6 and the upper case 7, while the supply device 14 and the heating/cooling device 15 are provided outside the accommodation space 8, as shown in FIG. 7. A supply space 9 is formed between the lower case 6 and the lower surface of the battery pack 5 while a discharge space 10 is formed between the upper case 7 and the upper surface of the battery pack 5, thereby allowing the heat medium to flow upward in the heat medium passage 3 in the battery pack 5. In the lower part of the accommodation space 8, an introduction port 23 for introducing the heat medium is provided. The introduction port 23 is connected to the supply space 9 via a supply passage 9a formed in the extending part of the lower case 6. In the upper part of the accommodation space 8, a discharge port 24 is provided for discharging the heat medium after being subjected to heat exchange. The discharge port 24 is connected to an exhaust tube 25.

According to the above configuration, since the supply device 14 and the heating/cooling device 15 are provided outside the battery pack apparatus 101, the compact configuration is achieved. Such a compact structure increases the flexibility in choosing a space where the battery pack apparatus 101 is placed. Moreover, another supply device and another heat-medium supply device that are mounted on an automobile can be used.

Third Embodiment

Figure 8:
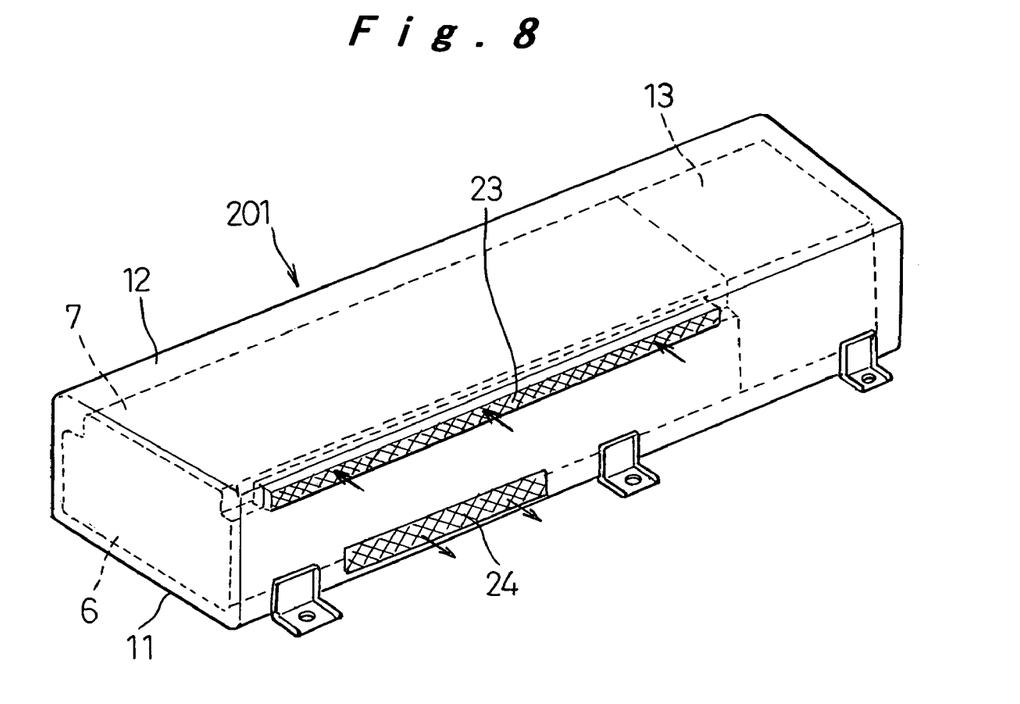
FIG. 8 is a perspective view of a main part of a battery pack apparatus according to a third embodiment of the invention.

Next, a battery pack apparatus according to a third embodiment of the present invention will be described with reference to FIG. 8.

In a battery pack apparatus 201 of the present embodiment, the introduction port 23 and the discharge port 24 described in the second embodiment are formed in a side face of the accommodation space 8, that is parallel to the longitudinal direction of the battery pack 5. The introduction port 23 is provided in the upper region of that side face, while the discharge port 24 is provided in the lower region of that side face. Moreover, as is the case with the first embodiment, the supply passage 9 is provided above the battery pack 5 and the discharge passage 10 is provided below the battery pack 5, thereby making the heat medium flow downward into the heat medium passages 3.

The battery pack apparatus 201 of the embodiment is suitably applied to a case where the size of the battery pack apparatus in the longitudinal direction is limited.

Fourth Embodiment

Figure 9:
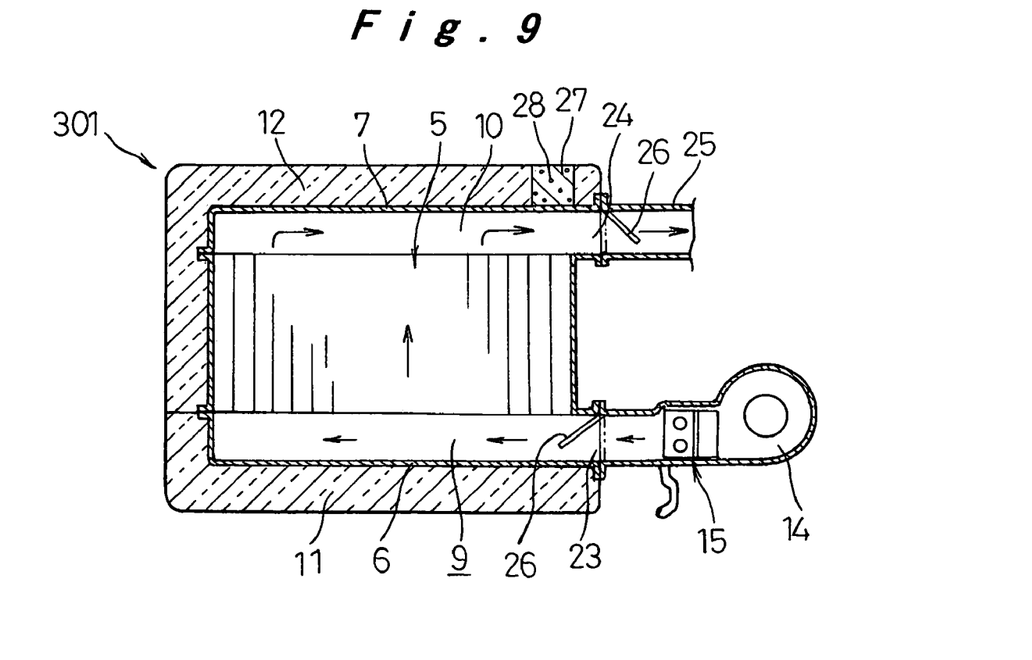
FIG. 9 is a longitudinal sectional front view of a battery pack apparatus according to a fourth embodiment of the invention.

Next, a battery pack apparatus according to a fourth embodiment of the present invention will be described with reference to FIG. 9.

In a battery pack apparatus 301 of the present embodiment, the battery pack 5 is provided within the accommodation space 8 that is formed by the lower and upper cases 6 and 7 and is covered with the heat insulation covers 11 and 12, and a valve 26 is provided at each of the introduction port 23 as an entrance of the supply passage 9 and the discharge port 24 as an exit of the discharge passage 10. This valve 26 is configured such that it is opened toward a direction of the flow of heat medium when the heat medium is made to flow, as shown with solid line in FIG. 9, whereas it is usually forced to a closed position shown with imaginary line in FIG. 9. Moreover, an opening 27 that is opened to the outside is formed at an appropriate portion at the upper end of the upper case 7 to penetrate the heat insulation cover 12. In the opening 27, a gas-escape passage forming member 28 that allows gas to escape to the outside, formed from sponge containing interconnected cells or the like, is provided.

By virtue of the valve 26, a sufficient flow rate of heat medium is obtained when the heat medium is supplied, and when the operation of the battery pack apparatus is stopped, the valves 26 close the entrance of the supply passage 9 and the exit of the discharge passage 10. Thereby, the heat medium of which the temperature has been adjusted is kept in the heat medium passage 3, while the supply passage 9 and the discharge passage 10 are thermally insulated from the outside by the heat insulation covers 11 and 12. This is effective in preventing the increase of temperature of the battery pack 5 by the effect of heat from the outside as well as overcooling state of the battery pack 5, thereby making the battery life longer and suppressing the decrease of the battery power at low temperatures. Moreover, leak of hydrogen gas or alkali mist flowing from the rechargeable battery 2 to the outside of the discharge passage 10 and supply passage 9 is suppressed, thereby preventing the adverse effect of the hydrogen gas or alkali mist on surrounding equipment. Furthermore, since hydrogen gas in the accommodation space 8 safely escapes to the outside through the gas-escape passage forming member 28, increase in concentration of the hydrogen gas is prevented, thereby ensuring the safety while achieving the above advantages of the present embodiment.

Please note that the valve 26 and the gas-escape passage forming member 28 can be applied to the first, second, and third embodiments.

According to the battery pack apparatus of the invention, heat exchange occurs on the substantially entire surface of each of the plurality of rechargeable batteries forming the battery pack by making the heat medium flow in the heat medium passage between the rechargeable batteries, thereby performing the temperature control efficiently and uniformly. Moreover, since the circumferential surface of the battery pack is covered with the heat insulation cover, escape of heat to the outside, as well as transfer of radiation heat from the outside and heat from the surrounding atmosphere, are prevented. Thus, high thermal efficiency is achieved and the whole battery pack is regulated at a predetermined temperature efficiently and uniformly without being affected by the surrounding condition. Accordingly, the increase and variation of temperature is reduced, so that the battery life is made longer.

Although the present invention has been fully described in connection with the preferred embodiment thereof, it is to be noted that various changes and modifications apparent to those skilled in the art are to be understood as included within the scope of the present invention as defined by the appended claims unless they depart therefrom.

What is claimed is:

1. A battery pack apparatus, comprising:
   a battery pack comprising a plurality of rechargeable batteries arranged in parallel and having heat medium passages formed therebetween;
   a heat insulation cover comprising a heat insulation material that covers a circumferential surface of the battery pack substantially entirely, a supply passage and a discharge passage being provided between the heat insulation cover and the battery pack, the supply passage supplying a heat medium to the heat medium passages while the discharge passage discharges the heat medium from the heat medium passages;
   a supply device that supplies the heat medium to the supply passage; and
   a heating/cooling device coupled to the supply device, wherein the heating/cooling device includes a heating device that heats the heat medium, a heat exchanger that cools the heat medium, and a protection net that collects and discharges drops of dew generated in the heating/cooling device.

2. The battery pack apparatus according to claim 1, wherein a covering layer formed by metal foil is provided on an outer surface of the heat insulation cover.

3. The battery pack apparatus according to claim 1, wherein the heating device comprises anyone of a PTC heater and a Peltier device that heats the heat medium.

4. The battery pack apparatus according to claim 1 wherein a valve is provided at each of an entrance of the supply passage and an exit of the discharge passage, each valve being capable of opening toward a direction of the flow of the heat medium.

5. The battery pack apparatus according to claim 1, wherein a gas-escape passage is provided at an upper end of a space closed by the valve within the heat insulation cover.

6. The battery pack apparatus according to claim 1, wherein a control unit that controls charge and discharge of the rechargeable batteries is arranged next to the battery pack and is accommodated in the heat insulation cover.

7. The battery pack apparatus according to claim 6, wherein an expanded space is formed in a region near and above the control unit in the space within the heat insulation cover to expand upward, and
   wherein an opening from the upper end of the expanded space to the outside is provided.

8. The battery pack apparatus according to claim 1, wherein the supply device and the heating/cooling device are arranged next to the battery pack and accommodated in the heat insulation cover, and
   wherein a discharge side of the supply device is connected to the supply passage via the heating/cooling device.

9. The battery pack apparatus according to claim 1, wherein the supply device and the heating/cooling device are arranged next to the battery pack and-is accommodated in the heat insulation cover, and
   wherein an intake side of the supply device is connected to the discharge passage via the heating/cooling device.

10. The battery pack apparatus according to claim 8, wherein a drain passage is provided for draining drops of dew formed in the cooling device to the outside of the heat insulation cover is provided.

11. The battery pack apparatus according to claim 8, wherein a water absorbing sheet is attached to an outer surface of a duct for connecting the supply device and at least one of the supply passage and the discharge passage.

12. The battery pack apparatus according to claim 8, wherein a duct for connecting the supply device and at least one of the supply passage and the discharge passage is formed from a heat insulation material.

13. The battery pack apparatus according to claim 9, wherein a drain passage is provided for draining drops of dew formed in the cooling device to the outside of the heat insulation cover is provided.

14. The battery pack apparatus according to claim 9, wherein a water absorbing sheet is attached to an outer surface of a duct for connecting the supply device and at least one of the supply passage and the discharge passage.

15. The battery pack apparatus according to claim 9, wherein a duct for connecting the supply device and at least one of the supply passage and the discharge passage is formed from a heat insulation material.

* * * * *